May 24, 1938.  D. F. KING  2,118,794

METHOD AND APPARATUS FOR DETERMINING FERTILITY OF EGGS FOR INCUBATION

Filed Dec. 10, 1937

INVENTOR
DALE F. KING

BY

G. P. Ely

ATTORNEY

UNITED STATES PATENT OFFICE 2,118,794

METHOD AND APPARATUS FOR DETERMINING FERTILITY OF EGGS FOR INCUBATION

Dale F. King, Auburn, Ala., assignor, by mesne assignments, to The Bundy Incubator Company, Springfield, Ohio, a corporation of Ohio Application December 10, 1937, Serial No. 179,179

8 Claims. (Cl. 88—14.1)

It is the purpose of this invention to provide an accurate and comparatively simple method for determining whether eggs set for the purposes of incubation are fertile, and to accomplish this purpose very early in the incubation period, and before the eggs which are infertile have been rendered unfit for consumption.

In the incubator art it has long been recognized that if an accurate method of determining fertility of eggs could be devised so that the eggs to be rejected for lack of fertility could be economically salvaged, such means would not only save very large amounts in the resale of the rejected eggs, but would also contribute materially to the efficiency of the incubator equipment, for the available space in the incubator would not be taken up by infertile and non-productive eggs.

It was the general practice in the older types of incubators to candle the eggs on the seventh day, when the infertile eggs could be readily identified by the absence of characteristic changes which are indicative of fertile eggs. In the more modern forced draft incubators, it has been the general practice either to let the infertile eggs remain in the incubator for the full period of twenty-one days or to remove the infertiles on the eighteenth day when the eggs are transferred to the hatching trays. Other methods of handling this problem have been carried on, but, prior to the present invention, it has been impossible to identify the infertiles until they have been rendered unfit for any practical use.

In the normal and expected operation of hatcheries, and with the most careful and exacting precautions and oversight of flocks, between 15 and 20 percent of all eggs set for incubation prove to be infertile. With the immense incubator capacity in the United States alone, approximately 300,000,000 eggs are a total loss each year due to the inability to detect the infertility of these eggs at a sufficiently early time.

By the present invention this loss is greatly reduced because the infertile eggs can be removed while still in an edible condition. While the method is subject to human error, it has been found in extensive tests that 5 percent or less error will occur with reasonably careful manipulation.

The invention also includes an apparatus designed and suitable for the purpose.

The description herein of the method and apparatus gives the best known and preferred form of the invention as it has been found to be successful, but it will be understood that changes, improvements, or modifications coming within the scope of the invention may be used, and such as fall within the purview of the invention are intended to be covered herein.

Figure 1:
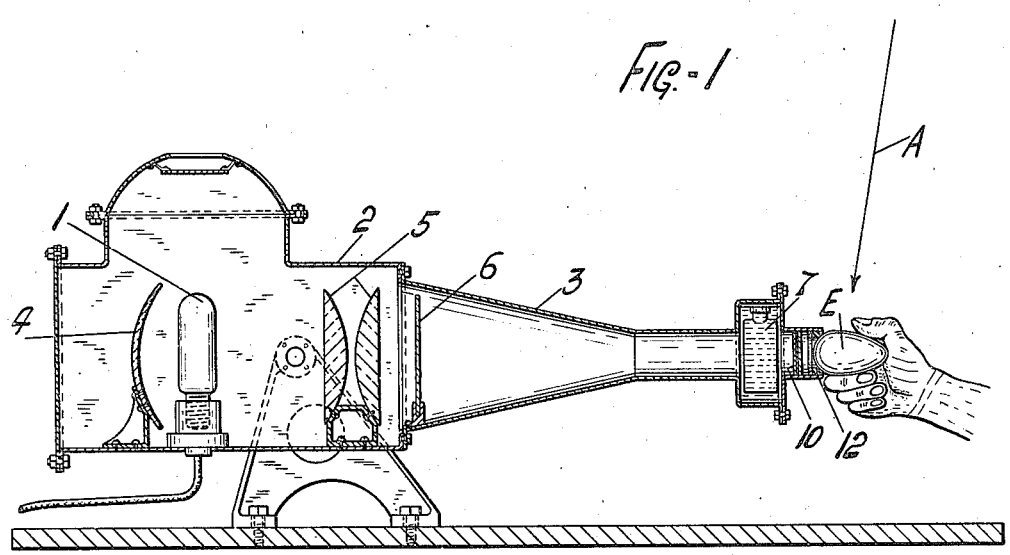
Fig. 1 is a side elevation partly in section, showing the form of apparatus which has been successfully used.

The invention is based upon the discovery that when an egg is subjected to light from which certain rays have been removed, the yolk will appear as a darkened area against which the living blastoderm in the fertile eggs may be distinguished.

The biological processes should be understood before the invention can be adequately explained. A normal hen will lay one egg at intervals of somewhat more than twenty-four hours. As the yolk of an egg passes into the oviduct it carries the infertile female germ, and if the egg is fertilized the female germ unites with the male germ during its transmission through the oviduct. The heat of the hen, during the passage through the oviduct, causes the fertile cell to grow during the period before the egg is laid, but insufficiently so that all active germs may readily be detected at the time the egg is laid.

The growth of the cell is arrested at laying and it is, therefore, advisable to subject the egg to a short period of incubation at proper temperature to cause the blastoderm to grow sufficiently to be easily and accurately discernible. In experiments conducted during the development of the invention, it has been found that a maximum of fifteen hours' incubation at the incubating temperature (98½° to 100° F.) will give all of the development necessary to the successful working of the invention, but this time may be shortened, and it has been found that various shorter or longer intervals may be adopted, varying inversely with the temperature. If an egg does not respond to the test at the end of fifteen hours, it may safely be rejected and this is before it deteriorates to such an extent that it is not usable for food purposes.

The eggs are now ready to be subjected to the test in the apparatus to be described.

The apparatus comprises a high powered source of light, such as a 115 volt, 500 watt "Mazda" bulb 1 which is contained in a light-proof casing 2 having an elongated outlet 3 through which the rays of light are directed. A concave silvered glass reflector 4 may be located behind the light to concentrate its rays toward the outlet.

Two condensing lenses 5 are located between the light and the outlet. In case a gelatine light filter is used, it is advisable to interpose a heat absorbing glass 6 between the light and the outlet so as to protect the gelatine film. In event that a suitable heat resisting filter, such, for example, as a glass filter, is employed, this is not essential. It is also advisable to place a water cell, usually a glass container 7 filled with water, at the filter to protect it still further.

Light which has not been passed through the filtering medium will pass through the yolk of the egg at this stage of its maturity either wholly or to such an extent as to render the process inaccurate, but if the light beam is subjected to a filter which will eliminate the rays on the red side of the spectrum, or the longer rays, those which do pass through the filter, will not penetrate the yolk and it will appear as a substantially dark area.

For white-shelled eggs it has been found advisable to provide a blue-green light filter which will pass rays from 430-550 millimicrons. For brown-shelled eggs rays should be passed up to 700 millimicrons. These figures are indicative only of the limits required for they may be varied at discretion, it being sufficient to say that, for the white-shelled eggs, the blue and green rays should be used, while for the brown-shelled eggs, it is advisable to admit some of the yellow rays. The light rays penetrate the white of the egg in order that the blastoderm be visible.

A light filter for the purpose is indicated at 10. Light filters for the purpose may be obtained, it being found that a gelatine film mounted between two glass disks is suitable for the purposes.

At the end of the outlet a soft rubber ring 12 may be located, which will give a positive seal about the egg and prevent the escape of rays.

The egg is indicated at E, and when held against the outlet and viewed from above, as indicated by the arrow A, will show the conditions which make it possible to determine the fertility of the egg.

Figures 2, 3:
Fig. 2 is a view showing a fertile egg.
Fig. 3 is a view showing an infertile egg, these views showing the manner in which fertility is detected and determined.

The blastoderm of the egg is originally in the flat or blastula form, but as it grows it develops into the gastrula or spherical or spheroidal form, and when incubated for the periods specified it becomes spherical and sufficiently large to be readily discernible. As it is lighter in weight than the other contents of the egg, it will rise to the top of the egg, and if the egg is held with its longitudinal axis in a horizontal or substantially horizontal plane for a sufficient interval or twisted while held against the outlet, the blastoderm will be seen floating above the darker background of the yolk. As the blastoderm B is spherical, the light rays which strike its side will be reflected as a bright crescent C against the darker body of the yolk Y. This is shown in Fig. 2. In Fig. 3, the absence of the living blastoderm in the infertile egg is readily apparent.

From this description of the process it is apparent why the use of a light filter is necessary to the accuracy of the process, for without the darker background of the yolk created by the elimination of the rays which will penetrate it, the light rays reflected from the side of the spherical blastoderm would not be visible.

It will be understood that it is essential that the egg be viewed from a point above the egg as otherwise the blastoderm will not be visible, as it will be hidden from view by the yolk. The horizontal or substantially horizontal position of the long axis of the egg is desirable for if the egg is held with its long axis at or approaching the vertical, the blastoderm will float upwardly until it no longer appears against the background of the dark yolk. If the blastoderm is not located in a line of vision against the dark background of the yolk, the reflected light from the side of the blastoderm will not be discernible.

The benefits of the process will be principally reflected in the increased efficiency of the incubators, the additional production of chicks, and the reduction in cost of operation by the revenue derived from the sale of infertiles recovered. It is possible to eliminate substantially all of the loss of production by elimination of the infertile eggs. The process is easily learned and is simple and accurate.

It is possible to improve upon the basic principles of the invention and to change and modify its details. The room in which the process may be performed should be kept as dark as possible, and while a more intense light than that generated by a 500 watt "Mazda" lamp may be employed, it has not been found to be necessary or essential. It is advisable to pass the light rays through the egg on its larger axis, and to present the rounder or air-cell end of the egg to the light orifice. To secure the maximum efficiency of the incubator, it should be overloaded sufficiently to compensate for the expected infertiles. As the period of incubation required to develop the blastoderm to the size required for the test is less than a day, such overloading does not interfere with the process of incubation.

If a source of light is used which will generate only the required rays, the filtering medium may be omitted.

While it is preferred to locate the filter between the light and the egg, the benefits of the invention will be secured if the rays of light reaching the eye of the operator be filtered to remove the yolk penetrating rays.

What is claimed is:

1. A process of determining the fertility of an egg for incubation comprising the steps of incubating the egg to a point where the blastoderm, if present, becomes visible to the eye, but short of the point where, if infertile, the egg becomes unfit for consumption, and passing to the eye and through the egg in a substantially horizontal direction, while the long axis of the egg lies in a substantially horizontal plane, light from which the long rays have been eliminated so that the yolk appears as a dark body against which rays reflected from the side of the blastoderm become apparent, and viewing the egg from above to determine the presence of the blastoderm.

2. A process of determining the fertility of an egg for incubation comprising the steps of incubating the egg to a point where the blastoderm, if present, becomes visible to the eye, but short of the point where, if infertile, the egg becomes unfit for consumption, and passing to the eye and through the egg in a substantially horizontal direction, while the long axis of the egg lies in a substantially horizontal plane, light from which rays longer than 700 millimicrons have been eliminated so that the yolk appears as a dark body against which rays reflected from the side of the blastoderm become apparent, and viewing the egg from above to determine the presence of the blastoderm.

3. A process of determining the fertility of an egg in which the development of the blastoderm, if present, has reached the spherical stage, but in which the egg, if infertile, has not reached the point where it is unfit for consumption, comprising passing through the egg while its long axis is in a substantially horizontally horizontal position, a substantially horizontal beam of light containing only those rays which will cause the yolk to appear as a dark background against which the light reflected from the side of the blastoderm will appear, and viewing the egg from above to determine the presence of the blastoderm.

4. A process of determining the fertility of an egg for the purpose of incubation comprising incubating the egg for a period of fifteen hours or less at approximately 100° F. until the blastoderm, if present, has reached the spherical stage and passing light in a substantially horizontal direction through the egg and to the eye while the long axis of the egg is in a substantially horizontal plane, filtering the light to eliminate rays which penetrate the yolk so that light reflected from the side of the blastoderm will appear as a bright crescent against the darker background of the yolk and viewing the egg from above to determine the presence of the blastoderm.

5. A process of determining the fertility of an egg for the purpose of incubation comprising the steps of incubating the egg to a point where the blastoderm, if present, becomes a spherical body visible to the eye, but short of the point where, if infertile, the egg has become unfit for consumption and passing through the egg while its long axis lies in a substantially horizontal plane, a beam of light in a substantially horizontal direction and filtering the light to absorb rays of wave lengths other than those which will not penetrate the yolk so that the yolk appears as a dark background against which light reflected from the side of the blastoderm will be visible and viewing the egg from above to determine the presence of the blastoderm.

6. An apparatus for determining the fertility of an egg comprising a casing, a source of light in the casing, a wall of the casing having an orifice to fit the egg when held with its long axis in a substantially horizontal position, a filter in the casing between the source of light and the orifice and of a character to absorb light-rays of wave lengths other than those which will not penetrate the yolk and means supporting the casing in a position such that the direction of light projection through the orifice is substantially horizontal.

7. An apparatus for determining the fertility of an egg comprising a casing, a source of light in the casing, a wall of the casing having an orifice to fit the egg when held with its long axis in a substantially horizontal position, a filter in the casing between the source of light and the orifice and of a character to absorb light-rays longer than 700 millimicrons and means supporting the casing in a position such that the direction of light projection through the orifice is substantially horizontal.

8. An apparatus for determining the fertility of an egg comprising a casing, a source of light in the casing, a wall of the casing having an orifice to fit the egg when held with its long axis in a substantially horizontal position, a filter associated with the apparatus of a character to absorb light rays of wave lengths which will penetrate the yolk, a support for the filter attached to the casing to hold the filter in the path of the light from the source and means supporting the casing in a position such that the direction of light projection through the orifice is substantially horizontal.

DALE F. KING.